(12) United States Patent
Tu (10) Patent No.: US 10,711,820 B2
(45) Date of Patent: Jul. 14, 2020

(54) COMPOSITE SCREW

(71) Applicant: SHEHKAI PRECISION CO., LTD., Kaohsiung (TW)

(72) Inventor: Tai-Yuan Tu, Kaohsiung (TW)

(73) Assignee: SHEHKAI PRECISION CO., LTD., Kaohsiung (TW)

(*) Notice: Subject to any disclaimer, the term of this patent is extended or adjusted under 35 U.S.C. 154(b) by 330 days.

(21) Appl. No.: 15/902,443

(22) Filed: Feb. 22, 2018

(65) Prior Publication Data
US 2019/0257343 A1 Aug. 22, 2019

(51) Int. Cl.
*F16B 25/00* (2006.01)
*F16B 25/10* (2006.01)

(52) U.S. Cl.
CPC ...... *F16B 25/0094* (2013.01); *F16B 25/0063* (2013.01); *F16B 25/0084* (2013.01); *F16B 25/106* (2013.01); *F16B 25/00* (2013.01)

(58) Field of Classification Search
CPC ............ F16B 25/0063; F16B 25/0084; F16B 25/0094; F16B 25/10; F16B 25/103; F16B 25/106; F16B 13/002; F16B 25/00
USPC .................. 411/386, 387.2, 387.4, 387.5
See application file for complete search history.

(56) References Cited

U.S. PATENT DOCUMENTS

| | | | | | |
|---|---|---|---|---|---|
| 3,715,952 A | * | 2/1973 | Fischer | ............... | F16B 13/0858 411/29 |
| 3,718,067 A | * | 2/1973 | Fischer | ................. | F16B 13/124 411/29 |
| 4,480,951 A | * | 11/1984 | Regensburger | ..... | F16B 25/0031 408/213 |
| 5,213,459 A | * | 5/1993 | Palm | ..................... | F16B 25/103 411/29 |
| 5,551,818 A | * | 9/1996 | Koppel | ................. | F16B 19/083 411/387.1 |
| 5,749,689 A | * | 5/1998 | Konig | ................. | F16B 25/0084 411/387.4 |

(Continued)

FOREIGN PATENT DOCUMENTS

| CN | 201279611 Y | 7/2009 |
|---|---|---|
| CN | 204934690 U | 1/2016 |

(Continued)

OTHER PUBLICATIONS

Search Report appended to an Office Action issued to Taiwanese counterpart application No. 106141107 by the TIPO dated Jul. 30, 2018.

*Primary Examiner* — Roberta S Delisle
(74) *Attorney, Agent, or Firm* — Muncy, Geissler, Olds & Lowe, P.C.

(57) ABSTRACT

A composite screw includes a tapping end portion that includes a circular bottom surface, a peripheral surface and a main thread. The peripheral surface extends from the circular bottom surface. The main thread is formed around the peripheral surface. A reception recess is recessed from the circular bottom surface and the peripheral surface. The main thread has a discontinuation where the reception recess opens at the peripheral surface. A rigid body and a weld material fill the reception recess. The rigid body has an outer surface and an auxiliary thread. The outer surface is exposed from the reception recess. The auxiliary thread is formed on the outer surface and connected to the main thread to fill the discontinuation.

5 Claims, 14 Drawing Sheets

(56) References Cited

U.S. PATENT DOCUMENTS

| | | | | |
|---|---|---|---|---|
| 6,079,921 | A | * | 6/2000 | Gauthier ............... F16B 13/002 411/110 |
| 6,120,225 | A | * | 9/2000 | Palm ..................... F16B 19/083 411/29 |
| 6,309,159 | B1 | * | 10/2001 | Weaver ............... E21D 21/0026 405/259.1 |
| 6,619,899 | B1 | * | 9/2003 | Gaudron ............. F16B 25/0026 411/386 |
| 7,214,019 | B2 | * | 5/2007 | Palm ................... F16B 25/0031 411/387.1 |
| 8,052,363 | B2 | * | 11/2011 | Palm ................... F16B 25/0031 411/387.1 |

FOREIGN PATENT DOCUMENTS

| | | |
|---|---|---|
| TW | 200302148 A | 8/2003 |
| TW | 201034786 A | 10/2010 |
| TW | 201434561 A | 9/2014 |

* cited by examiner

COMPOSITE SCREW

FIELD

The disclosure relates to a screw, and more particularly to a composite screw.

BACKGROUND

Figure 1:
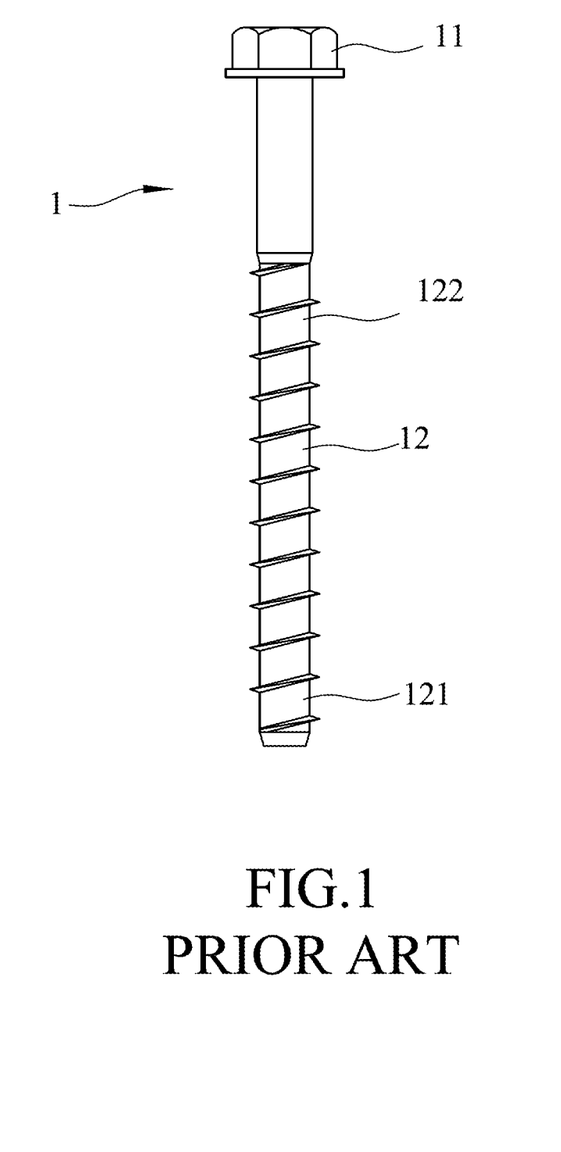
FIG. 1 illustrates an existing screw.

As shown in FIG. 1, an existing screw 1 includes a screw head 11 and a threaded shaft 12 extending downwardly from the screw head 11. The threaded shaft 12 has a fixing portion 122 proximate to the screw head 11, and a tapping portion 121 extending from the fixing portion 122 oppositely to the screw head 11. In order to endure stresses induced upon tapping, the existing screw 1 is entirely made from an expensive high strength steel material. However, because only the tapping portion 122, which carries out the tapping operation, requires the high strength material and such a high strength material is not essential for the remaining part of the existing screw, making the existing screw 1 entirely from the high strength material not only results in unnecessary material costs, but also wastes the high strength steel material.

SUMMARY

Therefore, an object of the disclosure is to provide a composite screw that is partially made from a high stiffness and strength material and that is sufficiently strong to endure tapping stresses.

According to the disclosure, a composite screw includes a screw body, at least one reception recess, and at least one composite unit.

The screw body has a tapping end portion that includes a circular bottom surface, a peripheral surface and a main thread. The circular bottom surface has a circle center. The peripheral surface extends upwardly from a circumference of the circular bottom surface. The main thread is formed around the peripheral surface.

The at least one reception recess is indented upwardly from the circular bottom surface and inwardly from the peripheral surface and has a height from the circular bottom surface as high as the tapping portion.

The at least one composite unit includes a weld material and a rigid body of high strength and stiffness material.

The weld material is filled in the at least one reception recess and secured to the screw body.

The rigid body is disposed in the at least one reception recess and fixed to the weld material. The rigid body and the weld material cooperatively and entirely fill the at least one reception recess. The rigid body has an outer surface and an auxiliary thread. The outer surface is exposed from the at least one reception recess. The main thread has a discontinuation where the at least one reception recess opens at the peripheral surface. The auxiliary thread is formed on the outer surface and connected to the main thread to fill the discontinuation.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
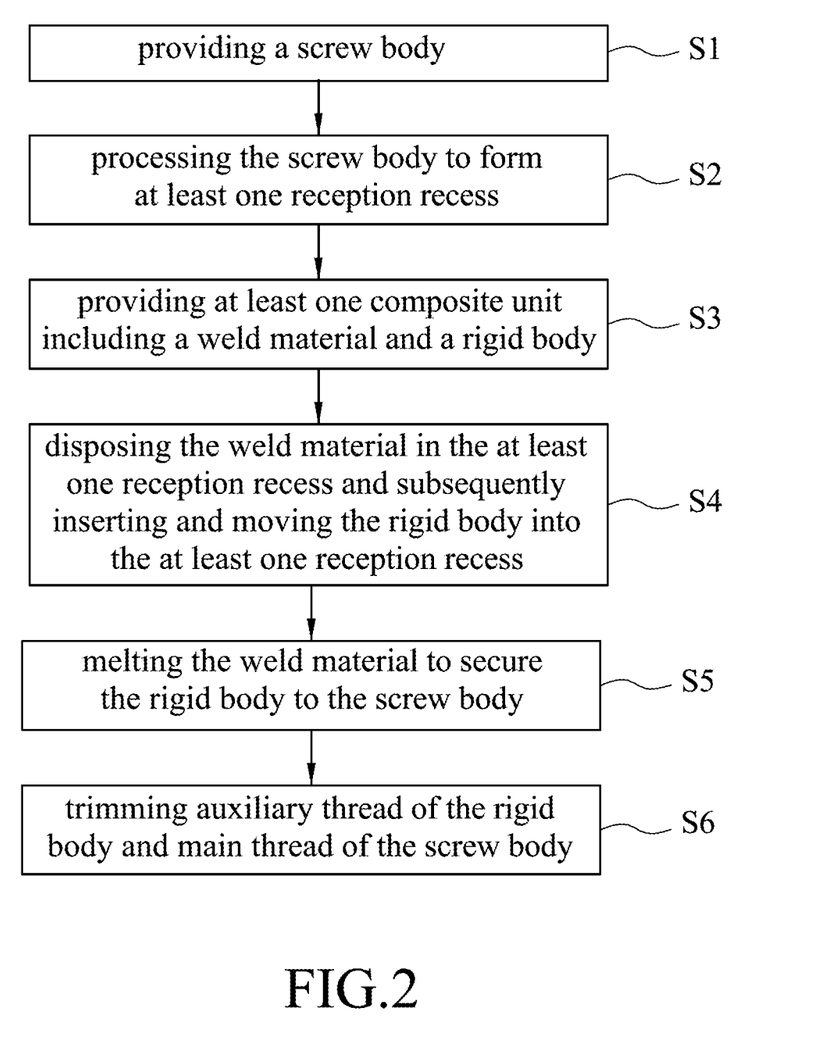
FIG. 2 is a flow chart, illustrating an embodiment of a method of producing a composite screw according to the present disclosure.

Referring to FIG. 2, a method according to an embodiment of the present disclosure is illustrated, which includes consecutive steps S1 to S6 to produce a first embodiment of a composite screw.

Figure 3:
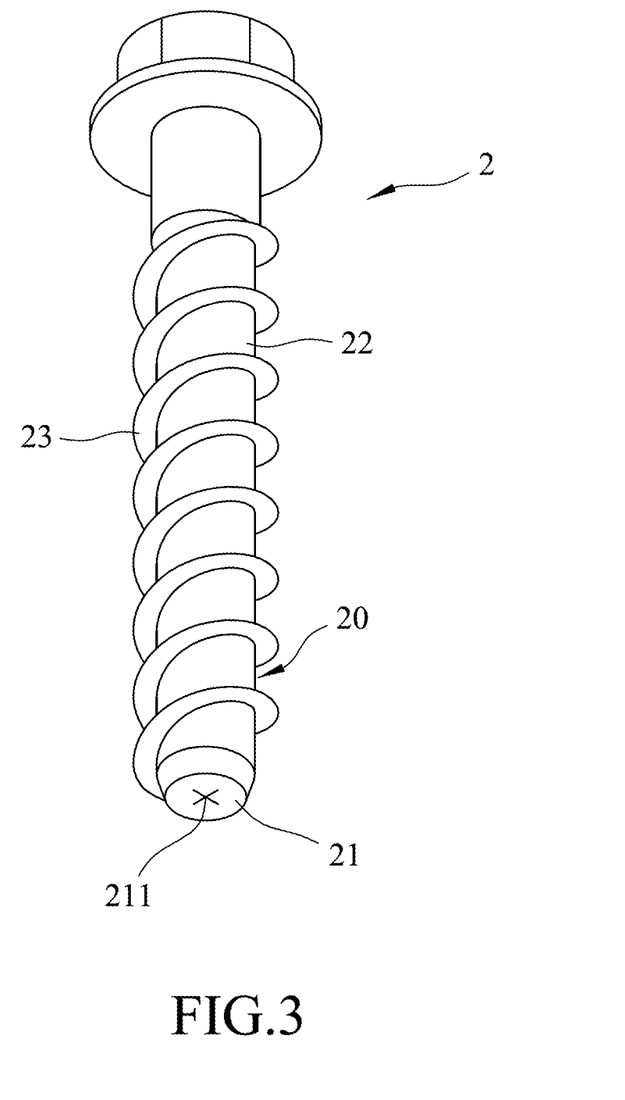
FIG. 3 is a perspective view showing a screw body used in the method to produce a composite screw of the first embodiment.

Referring to FIG. 3, in step S1, a screw body 2 is provided. The screw body 2 has a tapping end portion that includes a circular bottom surface 21, a peripheral surface 22 and a main thread 23. The circular bottom surface 21 has a circle center 211. The peripheral surface 22 extends upwardly from a circumference of the circular bottom surface 21. The main thread 23 is formed around the peripheral surface 22.

Figure 4:
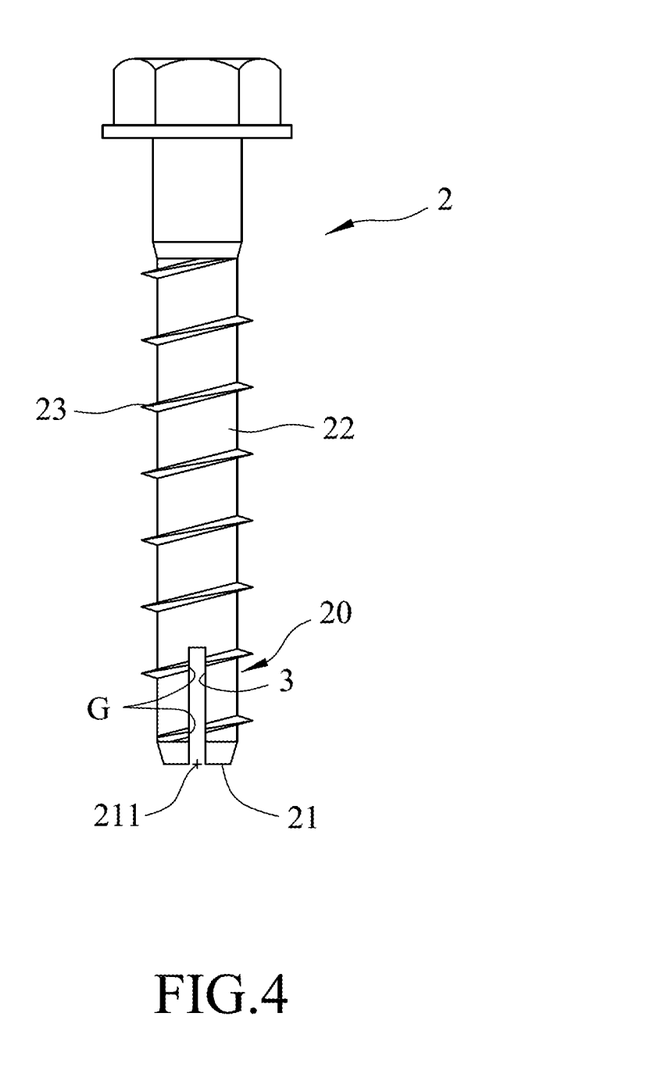
FIG. 4 is a side view of the screw body of the first embodiment formed with reception recesses.
Figure 5:
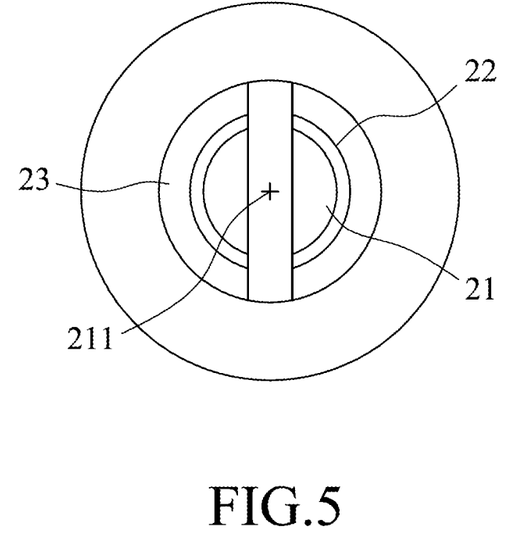
FIG. 5 is a bottom view of the screw body of FIG. 4.

Referring to FIGS. 4 and 5, in step S2, the screw body 2 is processed to form two reception recesses 3, each of which is indented upwardly from the circular bottom surface 21 and inwardly from the peripheral surface 22 and has a height from the circular bottom surface 21 as high as the tapping end portion 20. The two reception recesses 3 meet at the circle center 211 of the circular bottom surface 21. The reception recesses 3 subtend an angle of 180 degrees at the circle center 211. In this embodiment, the main thread 23 has discontinuations (G) (see FIG. 4) where the reception recesses 3 opens at the peripheral surface 22.

Figure 6:
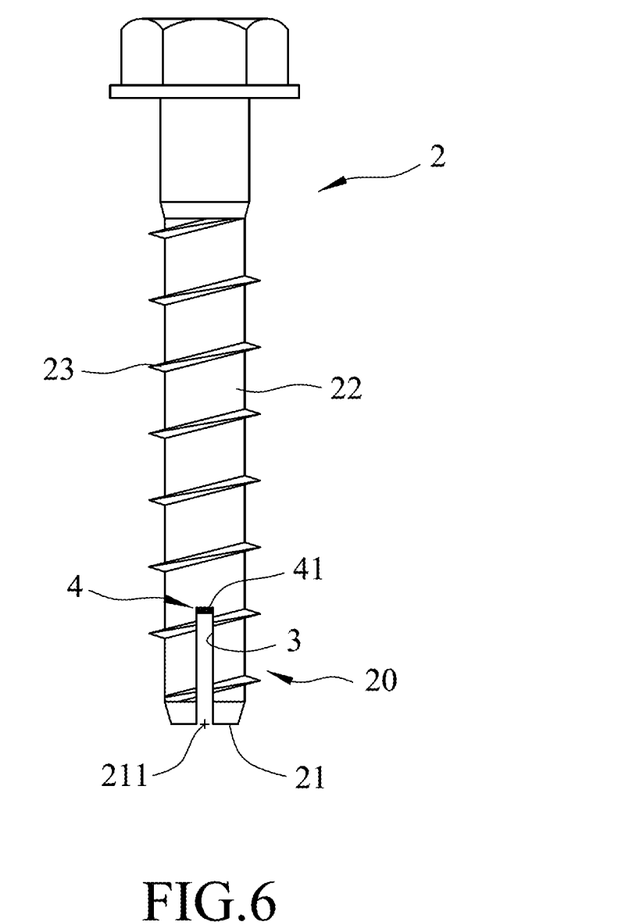
FIG. 6 is a side view showing a weld material of a composite unit filled into the reception recesses of the first embodiment.
Figure 7:
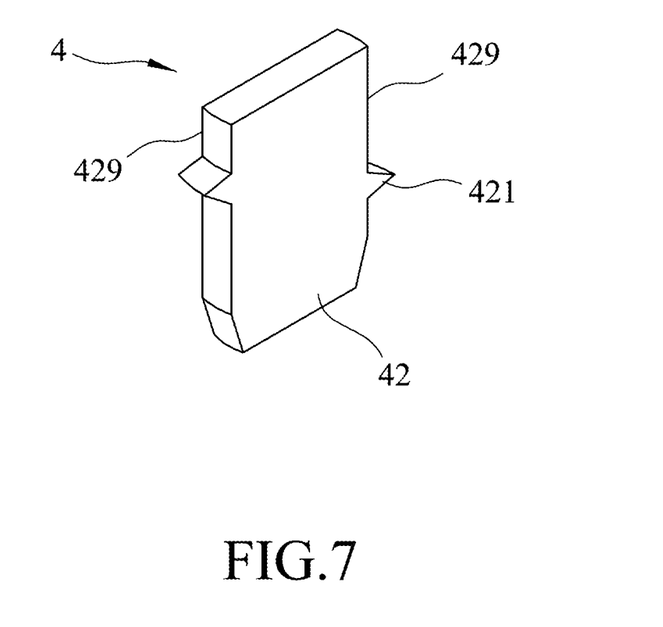
FIG. 7 is a perspective view of the first embodiment, illustrating a rigid body of the composite unit to be disposed in the reception recesses.

Referring to FIGS. 6 and 7, in step S3, a composite unit 4 is provided. The composite unit 4 includes a weld material 41 to be filled in the reception recesses 3, and a single piece rigid body 42 of high strength and stiffness material to be disposed in the reception recesses 3. The rigid body 42 has two outer surfaces 429 to be exposed from the respective reception recesses 3, and auxiliary threads 421 formed on the respective outer surfaces 429 to be connected to the main thread 23 for respectively filling the discontinuations (G). In this embodiment, the rigid body 42 is made from tungsten carbide suitable for tapping.

Figure 8:
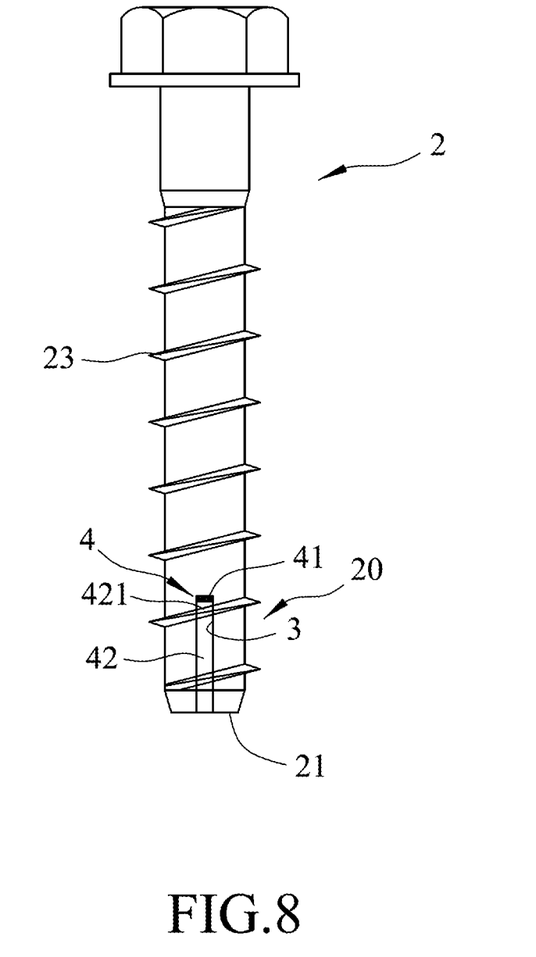
FIG. 8 is a side view illustrating the composite screw of the first embodiment.

Referring to FIG. 8, in combination with FIG. 6, in step S4, the weld material 41 is disposed in the reception recesses 3, and the rigid body 42 is subsequently inserted and moved into the reception recesses 3 to press the weld material 41 against the screw body 2.

As shown in FIG. 8, in step S5, the weld material 41 is melted to secure the rigid body 42 to the tapping end portion 20 by using a welding machine (not shown) to apply an electric current to the weld material 41.

In step S6, to eliminate irregularities caused by tolerable positional error, the auxiliary thread 421 of the composite unit 4 and the main thread 23 of the screw body 2 are trimmed using a grinder (not shown) after the weld material 41 secures the rigid body 42 to the tapping end portion 20 or the screw body 2 so that the connection of the main thread 23 with the auxiliary threads 421 becomes smooth and neat, or even perfect.

By virtue of the rigid body 42 secured to the tapping end portion 20 through the weld material 41, not only can an efficient tapping be feasible due to the high strength and stiffness of the rigid body 42, but also the fabrication cost can be saved because the screw body 2 can be made from a relatively low cost material.

Referring back to FIG. 8, in addition to the composite screw according to the first embodiment of the pre sent disclosure, the method illustrated in FIG. 2 may also produce other composite screws according to other embodiments of the present disclosure.

Figure 9:
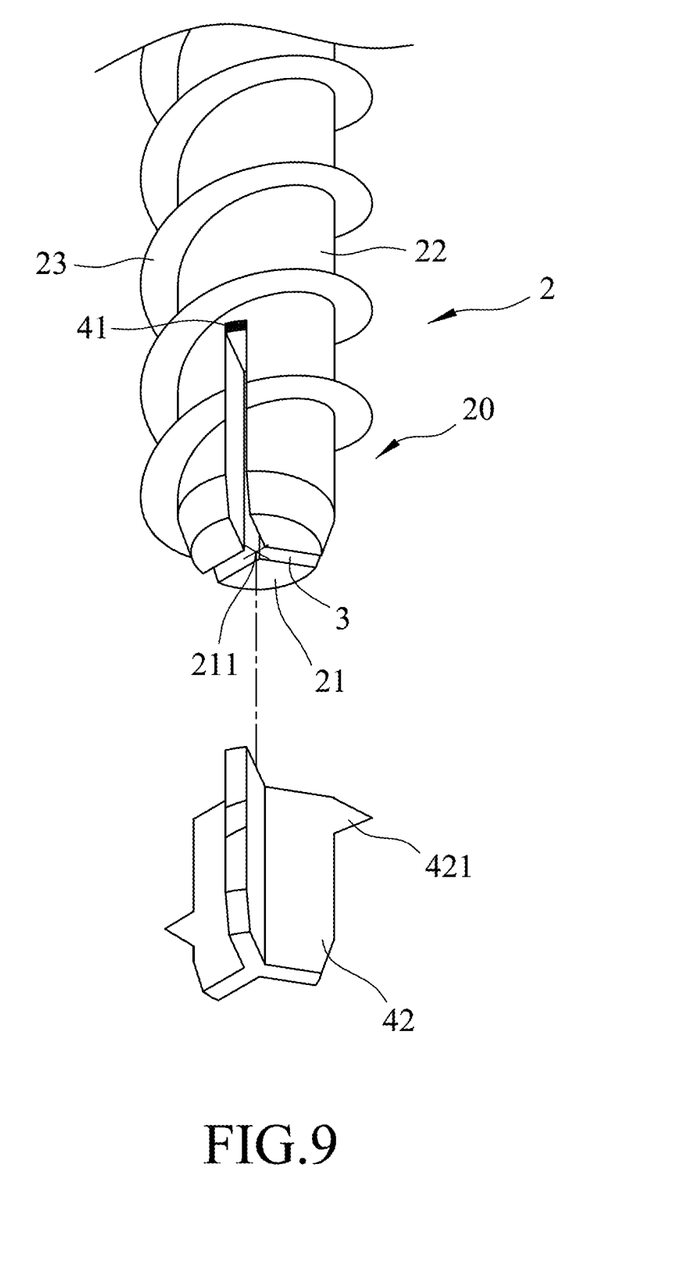
FIG. 9 is an exploded fragmentary perspective view of a composite screw according to a second embodiment of the present disclosure.
Figure 10:
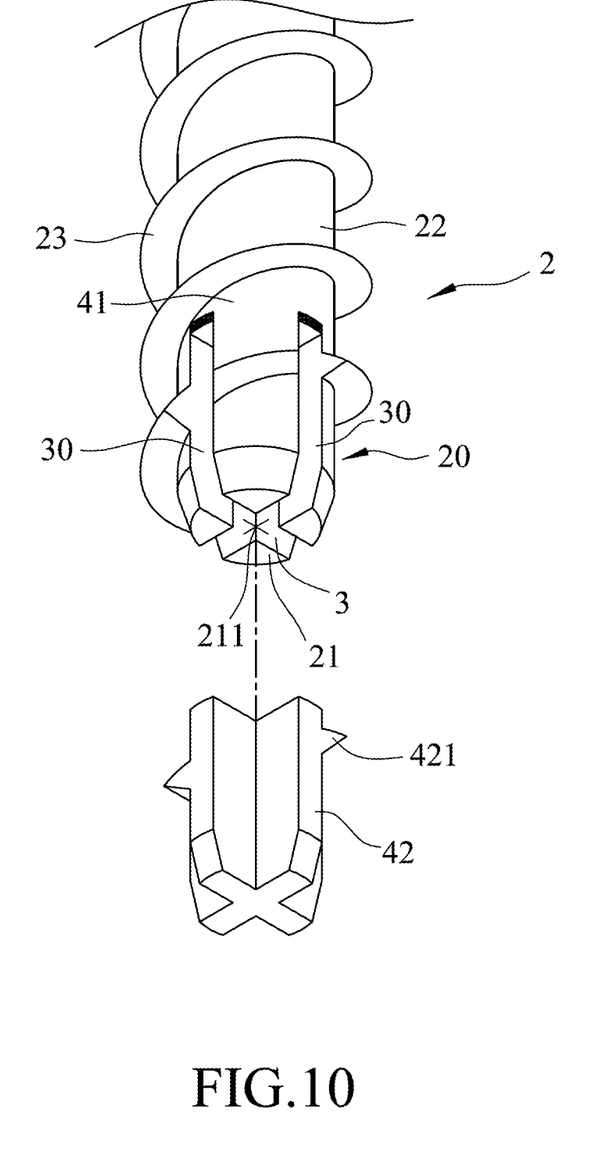
FIG. 10 is an exploded fragmentary perspective view of a composite screw according to a third embodiment of the present disclosure.

Referring to FIGS. 9 and 10, composite screws according to second and third embodiments of the present disclosure, which are generally similar to that of the first embodiment, are illustrated. However, the second embodiment includes three reception recesses 3 meeting or intersecting each other at the circle center 211. Every two adjacent ones of the reception recesses 3 subtend an angle of 120 degrees at the circle center 211. The third embodiment includes four reception recesses 3 which meet each other at the circle center 211. Every two adjacent ones of the reception recesses 3 subtend an angle of 90 degrees at the circle center 211. Because the reception recesses 3 in the second and third embodiments extend in different directions, the rigid bodies 42 of the second and third embodiments are unable to slide out of the reception recesses 3 from the peripheral surface 22 and can be effectively positioned to the screw body 2.

Figure 11:
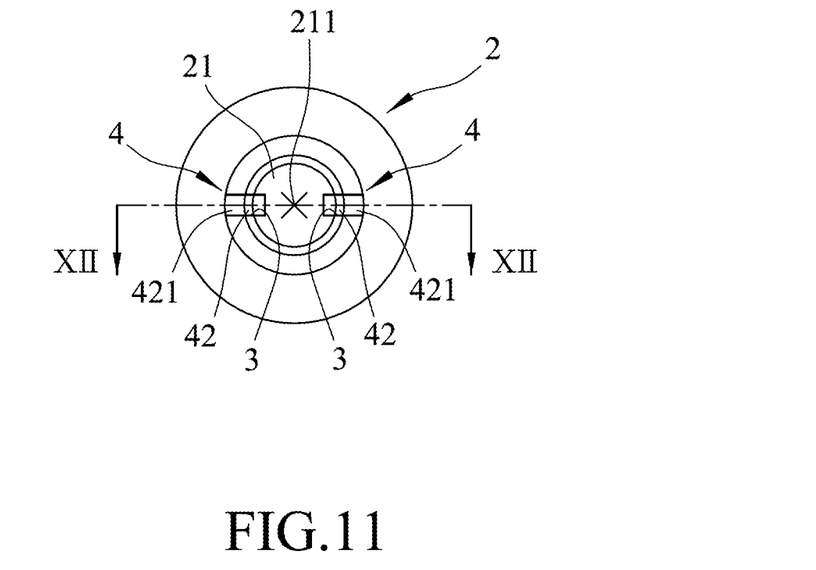
FIG. 11 is a bottom view of a composite screw according to a fourth embodiment of the present disclosure.
Figure 12:
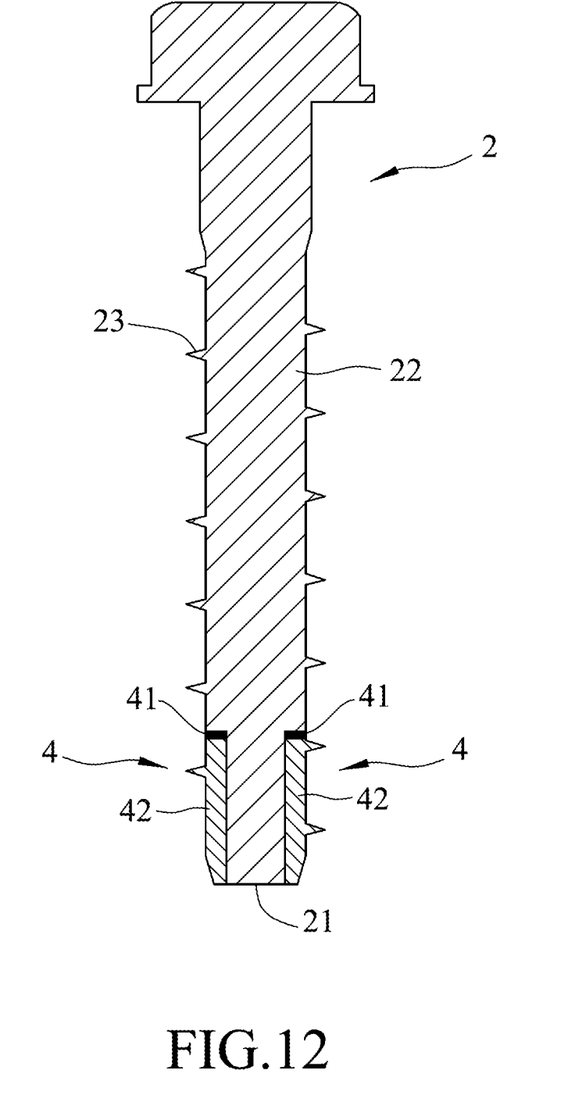
FIG. 12 is a sectional view of the fourth embodiment.
Figure 13:
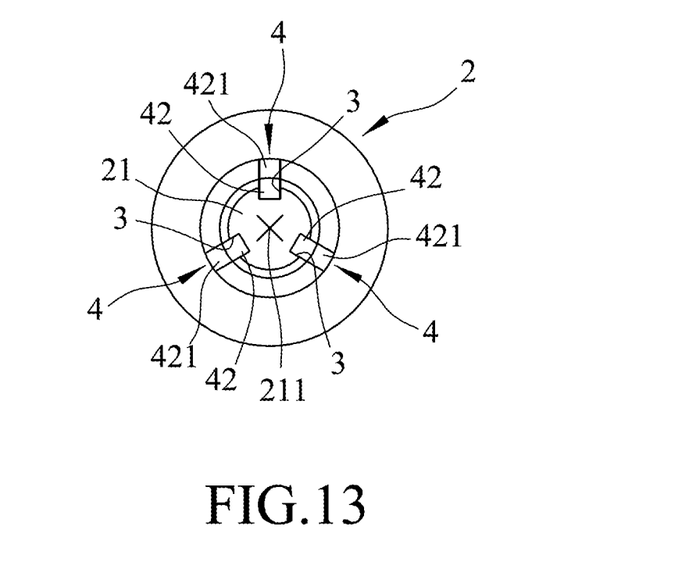
FIG. 13 is a bottom view of a composite screw according to a fifth embodiment of the present disclosure.
Figure 14:
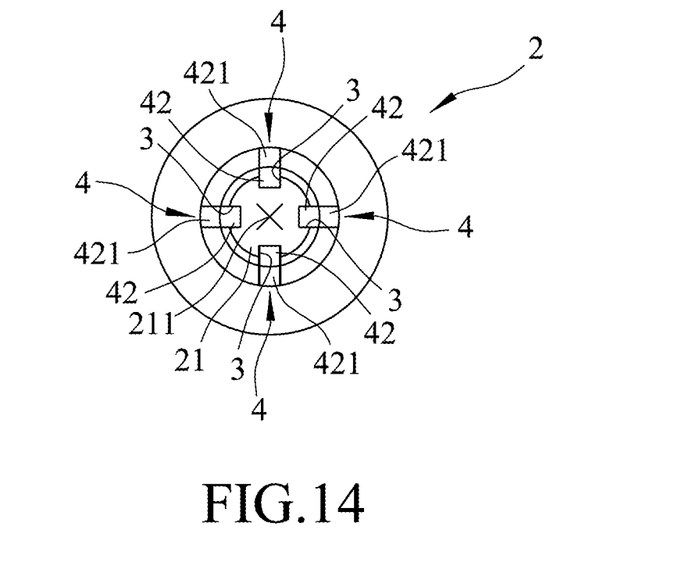
FIG. 14 is a bottom view of a composite screw according to a sixth embodiment of the present disclosure.

FIGS. 11 and 12 illustrate a composite screw according to a fourth embodiment of the present disclosure. FIG. 13 illustrates a composite screw according to a fifth embodiment of the present disclosure. FIG. 14 illustrates a composite screw according to a sixth embodiment of the present disclosure. A configuration of the composite screws of the fourth, fifth, and sixth embodiments is generally similar to that of the first embodiment. However, in the fourth embodiment, the composite screw includes two reception recesses 3 and two rigid bodies 42. The reception recesses 3 are spaced apart from each other and do not meet the circle center 211. In the fifth embodiment, the composite screw includes three spaced apart reception recesses 3 and three rigid bodies 42. In the sixth embodiment, the composite screw includes four spaced apart reception recesses 3 and four rigid bodies 42. In order to achieve uniform tapping stresses, the reception recesses 3 of the fourth to sixth embodiments are angularly spaced apart from each other in an equiangular manner, and every two adjacent ones of the reception recesses 3 subtend an equal angle at the circle center 211 of the circular bottom surface 21. In addition, the reception recesses 3 do not extend to the circle center 211. The reception recesses 3 as such can be formed in a relatively easy manner.

Figure 15:
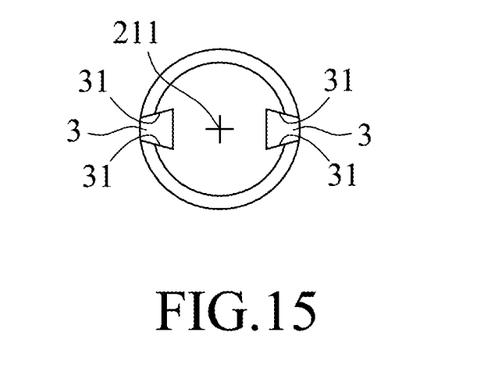
FIG. 15 is a bottom view of a composite screw according to a seventh embodiment of the present disclosure.
Figure 16:
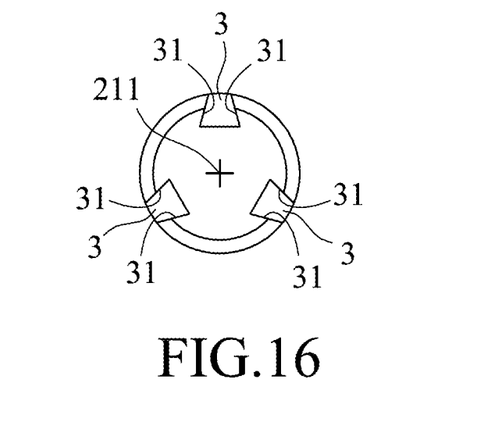
FIG. 16 is a bottom view of a composite screw according to an eighth embodiment of the present disclosure.
Figure 17:
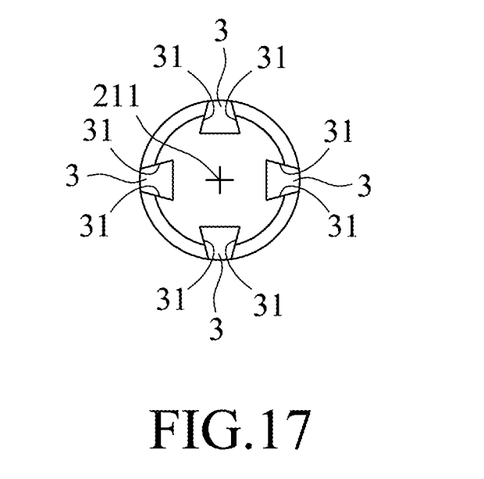
FIG. 17 is a bottom view of a composite screw according to a ninth embodiment of the present disclosure.

FIGS. 15, 16, and 17 illustrate composite screws according to seventh, eighth, and ninth embodiments of the present disclosure. The composite screws of the seventh to ninth embodiments have a configuration generally similar to that of the fourth embodiment. However, each reception recess 3 has two opposite bounding walls 31 meeting the circular bottom surface 21 and the peripheral surface 22. The opposite bounding walls 31 confront with each other and convergingly extend to the peripheral surface 22 from an inside of the screw body 2. When the rigid body 42 is disposed in the reception recess 3, the rigid body 42 can be effectively prevented from sliding out of the peripheral surface 22.

It is worth mentioning that the composite screws of the fourth to sixth embodiments (see FIGS. 11-14) can be produced by modifying the method illustrated in FIG. 2. Specifically, in steps S2 and S3, the number of the rigid bodies 42 is arranged to be equal to that of the reception recesses 3. In addition, the reception recesses 3 are arranged not to meet the circle center 211, thereby facilitating processing of the screw body 2. In the second to third embodiments (see FIGS. 9 and 10), the single piece rigid body 42 is provided with at least three branching parts that branch in at least three different directions so that the rigid body 42 can be limited efficiently from sliding outward from the peripheral surface 22. In seventh to ninth embodiments (see FIGS. 15 to 17), each reception recess 3 has two opposite bounding walls 31 that converge to the peripheral surface 22 so as to limit outward movements of the rigid body 42.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite screw, comprising:
a screw body having a tapping end portion that comprises a circular bottom surface, a peripheral surface and a main thread, said circular bottom surface having a circle center, said peripheral surface extending upwardly from a circumference of said circular bottom surface, said main thread formed around said peripheral surface;
at least one reception recess indented upwardly from said circular bottom surface and inwardly from said peripheral surface and having a height from said circular bottom surface as high as said tapping end portion; and
at least one composite unit comprising:
a weld material filled in said at least one reception recess and secured to said screw body, and
a rigid body of high stiffness material disposed in said at least one reception recess and fixed to said weld material, said rigid body and said weld material cooperatively and entirely filling said at least one reception recess, said rigid body having an outer surface and an auxiliary thread, said outer surface being exposed from said at least one reception recess, said main thread having a discontinuation where said at least one reception recess opens at said peripheral surface, said auxiliary thread being formed on said outer surface and connected to said main thread to fill said discontinuation,
wherein said at least one reception recess has two opposite bounding walls meeting said circular bottom surface and said peripheral surface, said opposite bounding walls confronting with each other and convergingly extending to said peripheral surface from an inside of said screw body.

2. The composite screw as claimed in claim 1, wherein said at least one reception recess comprises a plurality of reception recesses angularly spaced apart from each other, said at least one composite unit comprising a plurality of composite units, a number of said rigid bodies of said composite units being equal to that of said reception recesses, two adjacent ones of said reception recesses subtending an angle at said circle center of said circular bottom surface.

3. The composite screw as claimed in claim 1, wherein said rigid body is made from tungsten carbide.

4. The composite screw as claimed in claim 1, wherein said at least one reception recess comprises a plurality of reception recesses angularly spaced apart from each other, said reception recesses meeting each other at said circle center, two adjacent ones of said reception recesses subtending an angle at said circle center of said circular bottom surface.

5. The composite screw as claimed in claim 4, wherein a number of said reception recesses is greater than 3.

* * * * *